US011858484B2

(12) United States Patent
Brinkman et al.

(10) Patent No.: US 11,858,484 B2
(45) Date of Patent: Jan. 2, 2024

(54) APPARATUS AND METHOD FOR CURRENT DRAW MANAGEMENT IN A TRAILER BRAKE SYSTEM

(71) Applicant: GM GLOBAL TECHNOLOGY OPERATIONS LLC, Detroit, MI (US)

(72) Inventors: Todd J. Brinkman, Rochester Hills, MI (US); David B. Antanaitis, Northville, MI (US); Stacey M. Marmara, Markham (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 609 days.

(21) Appl. No.: 17/073,975

(22) Filed: Oct. 19, 2020

(65) Prior Publication Data

US 2022/0118961 A1   Apr. 21, 2022

(51) Int. Cl.
*B60T 13/74*   (2006.01)
*B60T 17/22*   (2006.01)
(Continued)

(52) U.S. Cl.
CPC .......... *B60T 13/741* (2013.01); *B60T 17/221* (2013.01); *B62D 63/08* (2013.01); *H01M 10/425* (2013.01); *H01M 10/48* (2013.01); *H01M 50/20* (2021.01); *B60T 7/20* (2013.01); *H01M 2010/4271* (2013.01); *H01M 2220/20* (2013.01)

(58) Field of Classification Search
CPC ........ B60T 13/741; B60T 17/221; B60T 7/20; B60T 8/323; B60T 17/22; B60T 17/00; B60T 2270/10; B62D 63/08; H01M 10/425; H01M 10/48; H01M 50/20; H01M 2010/4271; H01M 2220/20; H01M 50/249; Y02E 60/10; B60R 16/033
See application file for complete search history.

(56) References Cited

U.S. PATENT DOCUMENTS 3,740,691 A * 6/1973 Brown .................... B60T 13/58
                                                      338/92
4,938,542 A    7/1990 Kline et al.
(Continued)

FOREIGN PATENT DOCUMENTS

CA    2534703 A1 *  8/2006  ............. B60T 13/74
CN   109703542 A     5/2019
(Continued)

OTHER PUBLICATIONS

Definition of Rheostat, date unknown; retrieved on May 31, 2023 from https://byjus.com/physics/rheostat-and-rheostat-symbol/ (Year : 2023).*
(Continued)

*Primary Examiner* — Calvin Cheung

(57) ABSTRACT

A braking current management system for use in a towed trailer. The braking current management system comprises a battery health module configured to determine an amount of available battery current associated with the towed trailer and to generate therefrom an available current signal. The system further includes a trailer brake control module configured to receive the available current signal and, in response to the available current signal, to control an amount of current applied to a trailer brake associated with the towed trailer.

12 Claims, 3 Drawing Sheets

(51) Int. Cl.
*B62D 63/08* (2006.01)
*H01M 10/48* (2006.01)
*H01M 10/42* (2006.01)
*H01M 50/20* (2021.01)
*B60T 7/20* (2006.01)

(56) References Cited

U.S. PATENT DOCUMENTS

| | | | | |
|---|---|---|---|---|
| 6,165,095 | A * | 12/2000 | Till | F16H 48/34 |
| | | | | 192/84.2 |
| 6,752,474 | B1 * | 6/2004 | Olberding | B60T 13/741 |
| | | | | 188/3 R |
| 6,967,414 | B1 * | 11/2005 | Wedding | B60R 16/0315 |
| | | | | 307/147 |
| 7,621,603 | B2 | 11/2009 | Sato et al. | |
| 2005/0225169 | A1 | 10/2005 | Skinner et al. | |
| 2008/0143179 | A1 | 6/2008 | Rutherford | |
| 2016/0318421 | A1 * | 11/2016 | Healy | B60L 50/60 |
| 2018/0009377 | A1 * | 1/2018 | Troutman | B60T 17/221 |
| 2019/0217831 | A1 * | 7/2019 | Viele | G07C 5/0816 |
| 2020/0282965 | A1 * | 9/2020 | Pieronek | H04L 12/40 |

FOREIGN PATENT DOCUMENTS

| | | | |
|---|---|---|---|
| GB | | 1514965 A | 6/1978 |
| WO | WO-2018007747 | A1 | 1/2018 |

OTHER PUBLICATIONS

Chinese Office Action for Chinese Application No. 202110515846.9 dated Jun. 1, 2023.

\* cited by examiner

APPARATUS AND METHOD FOR CURRENT DRAW MANAGEMENT IN A TRAILER BRAKE SYSTEM

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to trailers that are equipped with automatic brake systems (ABS) that may draw power from another vehicle that is towing the trailer.

Under normal conditions, a dedicated trailer battery located in a towed trailer provides the supply current to the automatic brake system (ABS) of the trailer. For a variety of reasons, the trailer battery is frequently at a low state of charge. In such a case, the trailer braking system may draw its current from the +12 Volt power supply of the towing vehicle. However, the electromechanical braking system of the trailer may draw significantly more current than the +12V power supply of the towing vehicle can provide.

Additionally, the trailer electromechanical braking system current draw may exceed the available current from the 12v supply circuit resulting in blown vehicle or trailer fuses.

SUMMARY

Further areas of applicability of the present disclosure will become apparent from the detailed description, the claims and the drawings. The detailed description and specific examples are intended for purposes of illustration only and are not intended to limit the scope of the disclosure.

It is one aspect of the present invention to provide a braking current management system for use in a towed trailer. The braking current management system comprises: i) a battery health module configured to determine an amount of available battery current associated with the towed trailer and to generate therefrom an available current signal; and ii) a trailer brake control module configured to receive the available current signal and, in response to the available current signal, to control an amount of current applied to a trailer brake associated with the towed trailer.

In one embodiment, the trailer brake control module controls the amount of current applied to the trailer brake by controlling a brake pressure build rate associated with the trailer brake.

In another embodiment, the battery health module determines the amount of available battery current associated with the towed trailer by determining a charge on a trailer battery associated with the towed trailer.

In still another embodiment, the battery health module determines the amount of available battery current associated with the towed trailer by determining an amount of current available from a towing vehicle battery associated with a towing vehicle that is towing the towed trailer.

In yet another embodiment, the battery health module determines the amount of current available from the towing vehicle battery by determining a fuse parameter associated with the towing vehicle.

In a further embodiment, the battery health module determines the amount of available battery current associated with the towed trailer by determining a combined amount of current available from: i) a trailer battery associated with the towed trailer, and ii) a towing vehicle battery associated with a towing vehicle that is towing the towed trailer.

In a still further embodiment, the battery health module determines the amount of current available from the towing vehicle battery by determining a fuse parameter associated with the towing vehicle.

It is still another object of the disclosure to provide a trailer adapted for towing by a towing vehicle. The trailer comprises: i) a trailer battery; ii) a plurality of brakes associate with wheels of the trailer; and a iii) braking current management system. The braking current management system comprises: iv) a battery health module configured to determine an amount of available battery current associated with the trailer and to generate therefrom an available current signal; and v) a trailer brake control module configured to receive the available current signal and, in response to the available current signal, to control an amount of current applied to a trailer brake associated with the towed trailer.

In one embodiment, the trailer brake control module controls the amount of current applied to the trailer brake by controlling a brake pressure build rate associated with the trailer brake.

In another embodiment, the battery health module determines the amount of available battery current associated with the towed trailer by determining a charge on the trailer battery.

In still another embodiment, the battery health module determines the amount of available battery current associated with the towed trailer by determining an amount of current available from a battery of the towing vehicle.

In yet another embodiment, the battery health module determines the amount of current available from the battery of the towing vehicle by determining a fuse parameter associated with the towing vehicle.

In a further embodiment, the battery health module determines the amount of available battery current associated with the towed trailer by determining a combined amount of current available from the trailer battery and a battery of the towing vehicle.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

The present disclosure is directed to a braking system and method that limit the current build rate in the brakes of a towed trailer. The system includes an algorithm that limits trailer brake current build rate to maintain current draw within limits defined by an available current signal from a battery state of health module. The system also includes an algorithm that adjusts software limits on trailer brake current draw based on available current from both the towed trailer battery and the towing vehicle battery.

Figure 1:
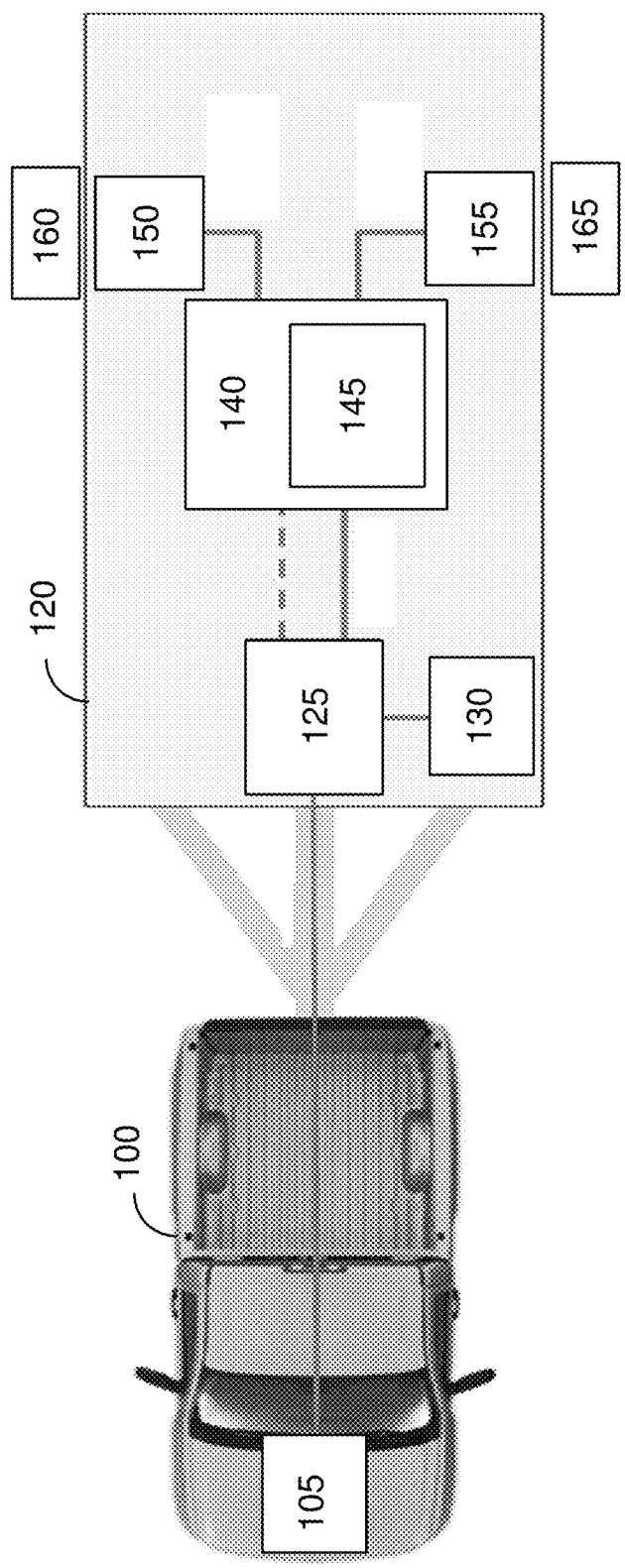
FIG. 1 illustrates an exemplary braking current management system in a trailer towed by another vehicle according to an exemplary embodiment of the disclosure.

FIG. 1 illustrates an exemplary braking current management system in a trailer towed by another vehicle according to an exemplary embodiment of the disclosure. A towing vehicle 100 tows a trailer 120 and provides +12 volt direct current (VDC) power to the trailer 120 from a battery 105 in the vehicle 100. The trailer 120 comprises a battery health module 125, a separate trailer battery 130, and a trailer brake control module 140, which executes a current management algorithm 145 stored in a memory associated with the trailer brake control module 140.

According to the principles of the present disclosure, the trailer brake control module 140 and the brakes 150 and 155 comprise an electromechanical braking system, such as an automatic brake system (ABS). The trailer brake control module 140 controls the current applied to brakes 150, which control tire 160, and to brakes 155, which control tire 165.

In the exemplary embodiment, the trailer brake control module 140 draws +12 VDC supply current from trailer battery 130. However, since the charge on trailer batter 130 may be low, the trailer brake control module 140 is configured to draw +12 VDC supply current from the vehicle battery 105 in the towing vehicle 100. However, to protect the vehicle battery 105, the battery health module 125 provides an Available Current signal to the trailer brake control module 140. The trailer brake control module 140 uses the Available Current signal and the current management algorithm 145 to adjust the braking parameters of the electromechanical braking system of the trailer 120 in order to manage the total current draw within the limits of the available power determined by the battery health module 125.

Experimental testing determined the relationship between the brake pressure build rate the trailer 120 and the tow vehicle current draw for the electromechanical brake system. The disclosed apparatus protects voltage supply circuits by controlling trailer brake current draw and pressure build rate to maintain current draw within acceptable limits as defined in the Available Current signal.

Figure 2:
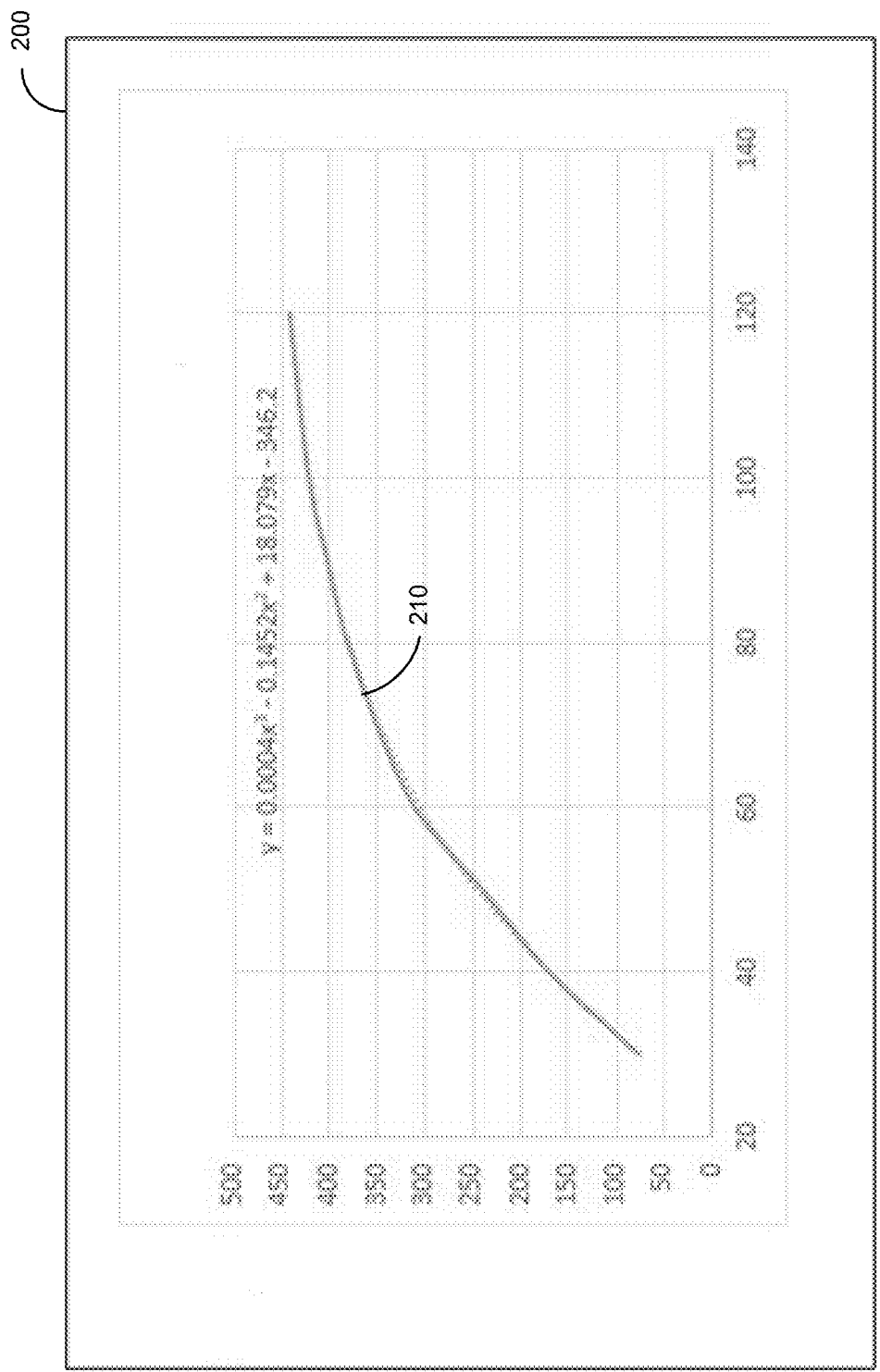
FIG. 2 is a graph illustrating an algorithm performed by the braking current management system for controlling braking pressure build rate and maximum current limits according to an exemplary embodiment of the disclosure.

FIG. 2 is a graph 200 illustrating the current management algorithm 145 performed by the trailer brake control module 140 for controlling braking pressure build rate and maximum current limits according to an exemplary embodiment of the disclosure. In FIG. 2, the pressure build rate is given in bar/sec, where "bar" is a unit of pressure. By way of example, bar may be pressure in pounds per square inch (lbs/in$^2$) applied perpendicularly to the brake pads. The curve 210 gives the maximum build rate (y) for a given value (x) of brake current according to Equation 1:

$$y=0.00004x^3-0.145x^2+18.079x-346.2,$$  [Eqn. 1]

where x is the current value in amperes.

According to the principles of the present disclosure, the trailer brake control module 140 keeps the pressure build rate below curve 210 in order not to exceed the available current value given by the Available Current signal from battery health module 125. For example, if the combined available current from vehicle battery 105 and trailer battery 130 is 60 amps, the trailer brake control module 140 will maintain the pressure build rate at or below 300 bar/sec.

The disclosed apparatus receives the Available Current signal from the battery health module 125 and then the current management algorithm manages brake pressure build rate on brakes 150 and 155 to maintain the braking system current draw within the allowable limits for the +12 VDC supply circuits of the vehicle 105. This allows a high current braking system to be used on the trailer 120 without blowing the fuse on the +12 VDC supply circuit of the vehicle battery 105 if the trailer battery 130 is in a low charge state. This functionality achieves the required braking performance targets on the trailer 120.

The trailer brake control module 140 manages the trailer brake maximum current and the pressure build rate to maintain the current draw within acceptable system limits for the combined +12 VDC power supply from the vehicle battery 105 and the trailer battery 130. This enables a low current degraded operation mode that maintains a reduced level of trailer brake performance if current is available from the tow vehicle battery 105, but not the trailer battery 130.

Figure 3:
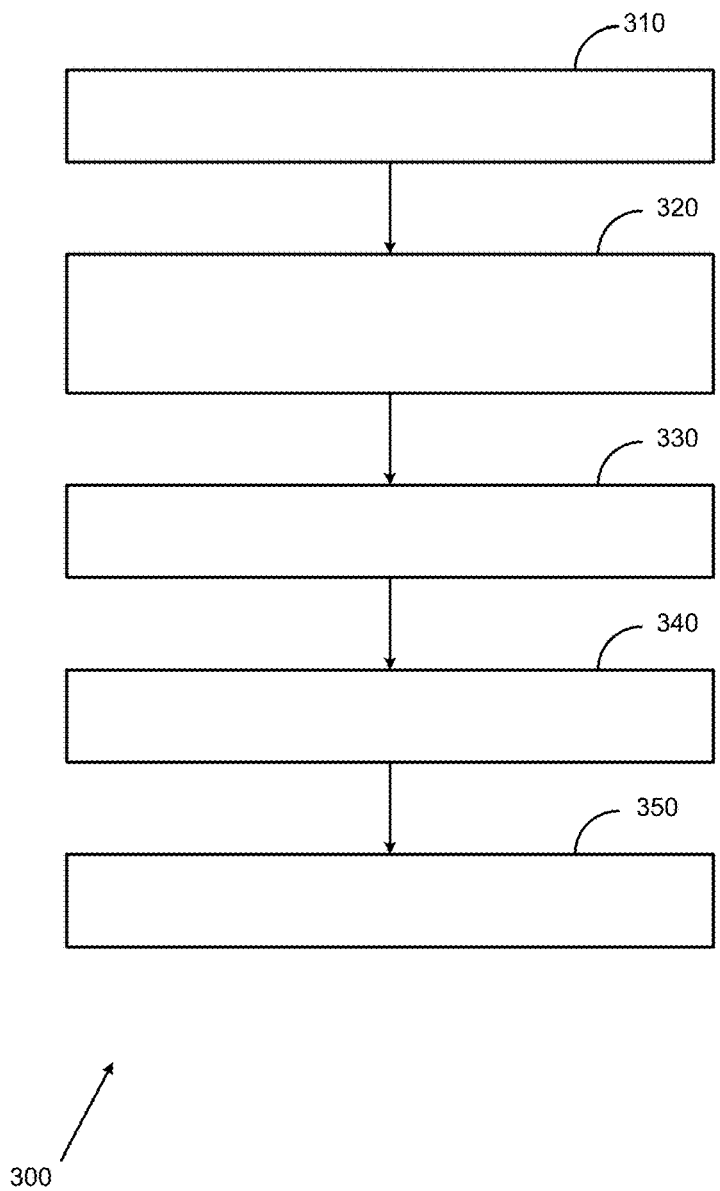
FIG. 3 is a flow diagram illustrating the operation of the braking current management system according to an exemplary embodiment of the disclosure.

FIG. 3 is a flow diagram illustrating the operation of the braking current management system according to an exemplary embodiment of the disclosure. In 310, the battery health module 125 monitors the trailer battery 130 state of health. In 320, the battery health module 125 determines the current available for trailer braking, including the calibrated values for the vehicle fuse limitations and the trailer fuse limitations. In 330, the battery health module 125 sends the Available Current signal to the trailer brake control module 140. In 340, the trailer brake control module 140 receives the Available Current signal from the battery health module 125. In 350, the trailer brake control module 140 controls the braking pressure build rate and the maximum current limits according to the current management algorithm 145.

In an alternative embodiment, it is noted that, even without input from the battery health module 125, the trailer brake control module 140 may maintain current within the capabilities of the fuses on the voltage supply system from the vehicle 105. It is also noted that either or both of the battery health module 125 and the trailer battery 130 may be implemented externally to the trailer 120.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A braking current management system for use in a towed trailer comprising:
   a battery health module configured to determine an amount of available battery current associated with the towed trailer and to generate therefrom an available current signal,
   wherein the battery health module is configured to determine the amount of available battery current associated with the towed trailer based on a combined amount of current available from: i) a trailer battery associated with the towed trailer, and ii) a towing vehicle battery associated with a towing vehicle that is towing the towed trailer; and
   a trailer brake control module configured to receive the available current signal and, in response to the available current signal, to control an amount of current applied to a trailer brake associated with the towed trailer.

2. The braking current management system of claim 1, wherein the trailer brake control module controls the amount of current applied to the trailer brake by controlling a brake pressure build rate associated with the trailer brake.

3. The braking current management system of claim 1, wherein the battery health module determines the amount of available battery current associated with the towed trailer based on a charge of the trailer battery associated with the towed trailer.

4. The braking current management system of claim 1, wherein the battery health module determines the amount of current available from the towing vehicle battery based on a fuse parameter associated with the towing vehicle.

5. A method of managing braking current in a towed trailer comprising:
   determining an amount of available battery current associated with the towed trailer based on a combined amount of current available from: i) a trailer battery associated with the towed trailer, and ii) a towing vehicle battery associated with a towing vehicle that is towing the towed trailer; and
   in response to the amount of available battery current signal, controlling an amount of current applied to a trailer brake associated with the towed trailer.

6. The method of claim 5, wherein controlling the amount of current applied to the trailer brake comprises controlling a brake pressure build rate associated with the trailer brake.

7. The method of claim 5, wherein determining the amount of available battery current associated with the towed trailer comprises determining the amount of available battery current based on a charge on the trailer battery associated with the towed trailer.

8. The method of claim 7, wherein determining the amount of current available from the towing vehicle battery comprises determining the amount of current available from the towing vehicle battery based on a fuse parameter associated with the towing vehicle.

9. A trailer adapted for towing by a towing vehicle, the trailer comprising:
   a trailer battery;
   a plurality of brakes associated with wheels of the trailer;
   a braking current management system comprising:
      a battery health module configured to determine an amount of available battery current associated with the trailer based on a combined amount of current available from: i) a trailer battery associated with the trailer, and ii) a towing vehicle battery associated with a towing vehicle that is towing the trailer; and
      a trailer brake control module configured to in response to the amount of available battery current, control an amount of current applied to a trailer brake associated with the towed trailer.

10. The trailer of claim 9, wherein the trailer brake control module controls the amount of current applied to the trailer brake by controlling a brake pressure build rate associated with the trailer brake.

11. The trailer of claim 9, wherein the battery health module determines the amount of available battery current associated with the towed trailer based on a charge on the trailer battery.

12. The trailer of claim 9, wherein the battery health module determines the amount of current available from the towing vehicle battery of the towing vehicle based on a fuse parameter associated with the towing vehicle.

* * * * *